United States Patent [19]

Sugai et al.

[11] Patent Number: 4,742,393

[45] Date of Patent: May 3, 1988

[54] SIGNAL RECEPTION SYSTEM FOR TELEVISION RECEIVER

[75] Inventors: Yoshiro Sugai; Hiroyuki Kimura, both of Kawagoe, Japan

[73] Assignee: Pioneer Electronic Corporation, Tokyo, Japan

[21] Appl. No.: 717,880

[22] Filed: Mar. 29, 1985

[30] Foreign Application Priority Data

Mar. 30, 1984 [JP] Japan .................. 59-062603

[51] Int. Cl.$^4$ .................. H04N 5/52; H04N 5/60
[52] U.S. Cl. .................. 358/188; 358/198
[58] Field of Search .................. 358/188, 191.1, 192.1, 358/195.1, 197, 198, 23, 189; 455/272, 275

[56] References Cited

U.S. PATENT DOCUMENTS

| 2,549,444 | 4/1951 | Foster | 358/189 |
| 4,272,788 | 6/1981 | Ogita | 358/198 |
| 4,443,344 | 2/1984 | Gradin | 455/277 |
| 4,591,915 | 5/1986 | Davidov | 358/198 |

FOREIGN PATENT DOCUMENTS

| 28640 | 2/1980 | Japan | 455/277 |
| 46657 | 4/1980 | Japan | 358/198 |

Primary Examiner—Tommy P. Chin
Attorney, Agent, or Firm—Fleit, Jacobson, Cohn & Price

[57] ABSTRACT

A signal receiving system for a TV receiver incorporates at least two independent front end circuits for frequency-converting antenna signals to a lower frequency, with the output signals from these front end circuits being utilized separately to derive the video and audio signal components of the TV signal. Independent control of AGC applied to the audio and video signal components respectively can thereby be implemented, or, in the case of diversity reception using two or more antennas, the optimum antenna for reception of the video and audio signal components respectively can be selected in a mutually independent manner, to thereby attain substantially improved diversity reception, e.g. for a TV installation in a moving vehicle.

23 Claims, 10 Drawing Sheets

SIGNAL RECEPTION SYSTEM FOR TELEVISION RECEIVER

BACKGROUND OF THE INVENTION

The method of signal reception generally used for television receivers at present is the intercarrier method, i.e. a method whereby the video and audio components of the modulated radio frequency television signal applied from a receiving antenna are processed within common circuit stages, to derive video and audio signals. The intercarrier method has the disadvantage that if the video signal carrier component of the antenna signal should fall to a very low level, i.e. due to fading, the audio signal output will cease together with the video signal output. Another reception method used for television reception is the split-carrier method. This has the disadvantage that it is necessary for satisfactory reception that the difference in level between the audio and video carrier components of the received antenna signal be substantially equal to 6 dB.

The audio and video carrier components of a television signal, although closely adjacent in frequency, occupy different frequency bands and employ different methods of modulation. That is to say, amplitude modulation (AM) is used for the video carrier, and frequency modulation (FM) for the audio carrier. Frequency modulation is very susceptible to multi-path fading interference, i.e. fading which results from radio waves reaching the receiving antenna along two or more different paths, for example due to reflections from aircraft flying nearby, in the case of a stationary television receiver installation, or due to reflections from large buildings, in the case of a mobile television receiver installation. However in the case of the audio carrier modulation component, since frequency modulation is used and since the modulation level is lower than in the case of FM audio broadcast signals, the audio signal produced by the television receiver is comparatively insensitive to the effects of multi-path fading. Multi-path fading interference will therefore have a much more serious effect upon the picture quality of a television receiver than upon the sound quality. In addition, due to the fact that the video and audio carrier components of the TV signal occupy different frequency ranges, these components will be affected differently by multi-path fading. Thus, it is possible that a maximum level of audio carrier component is being received from the antenna at a moment when the level of video carrier component is close to maximum. The requirements for operation of automatic gain control (AGC) circuits are therefore basically different, for the audio and video carrier components respectively. However in prior art types of television receiver, an AGC control signal derived on the basis of the level of received video carrier component is utilized to control the gain of common input circuit stages which process both the video and audio carrier components of the received antenna signal. Such input circuit stages are generally referred to collectively as the "front end" circuit, and essentially comprise frequency conversion circuits for converting the antenna signal to a lower frequency, and intermediate frequency (IF) circuits for amplifying this frequency converted signal within a specific bandwidth.

Furthermore, if diversity reception employing two or more antennas is adopted, to overcome the effects of multi-path fading, it is not possible to obtain satisfactory performance with respect to both the video and audio components of the television signal, with a conventional type of television receiver in which a common front end circuit is used to process both the audio and video carrier components of the received antenna signal. Selection of the antenna to be currently connected to the common front end circuit, in such a case, will be made upon the basis of the level of received video carrier component. Thus, it is possible that the selected antenna, while providing a satisfactory level of video signal will actually provide an excessively low level of audio signal. It can therefore be appreciated that, as in the case of AGC control, control of antenna selection in a television receiver employing diversity reception cannot be performed in a satisfactory manner with regard to both the audio and video components of the television signal, with a prior art type of television receiver in which a common front end circuit is used for the initial stages of frequency conversion, selection and amplification of the received antenna signal.

SUMMARY OF THE INVENTION

It is an essential feature of a signal reception system for a television receiver according to the present invention that at least two independently controlled front end circuits are incorporated. In the case of a television receiver which functions from a single receiving antenna, these two front end circuits are utilized to respectively perform at least frequency conversion (to an IF frequency) of the video and audio carrier components of the antenna signal, with independent control of AGC being performed for the video and audio components by the respective front end circuits. In the case of a television receiver which utilizes diversity reception, the two front end circuits are employed to select the antennas to be coupled thereto in such a manner as to provide optimum levels of both the audio and video signal components. In this way, the disadvantages of the prior art which arise as described above, due to the use of a common front end circuit to process both the audio and video signal components of the antenna signal, are substantially eliminated. The present invention is especially valuable in providing improved video and sound reception quality for a television receiver which is installed in a moving vehicle, since the invention enables the effects of multi-path fading to be reduced to a greater extent than has been possible with prior art types of television reception signal processing systems.

DESCRIPTION OF THE PREFERRED EMBODIMENTS

Figure 1:
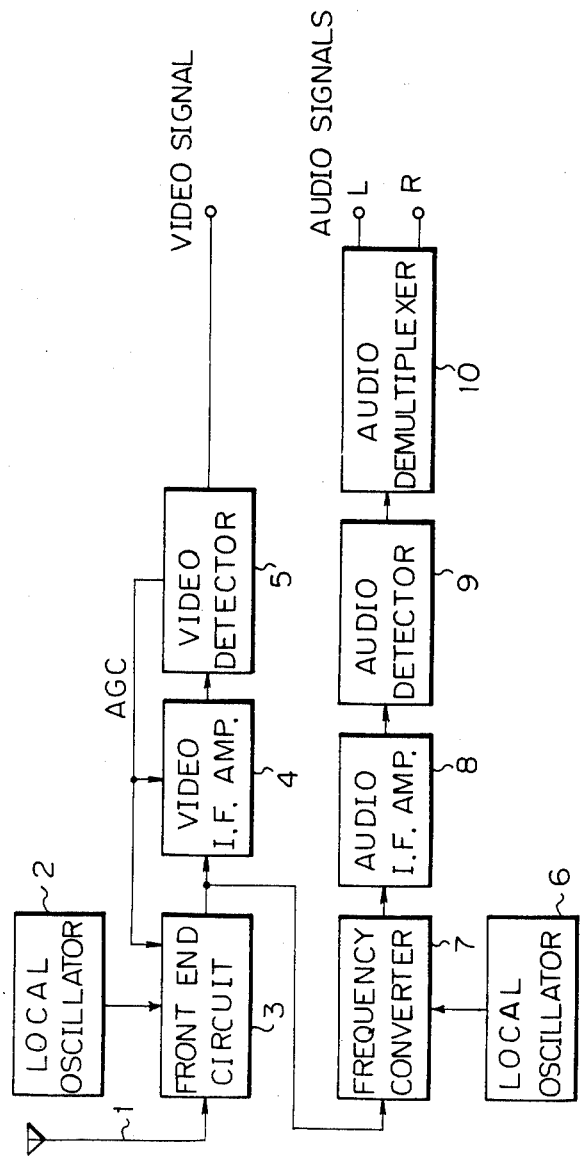
FIG. 1 is a general block circuit diagram of an example of prior art type of signal receiving system for a television receiver, for use with a single receiving antenna.

Before describing embodiments of the present invention, two examples of prior art types of signal receiving system for a television receiver will be described. referring first to FIG. 1. This is a block circuit diagram of a signal receiving system for a television receiver employing the split-carrier method of reception, for use with a single antenna, denoted by numeral 1. The modulated RF signal received by receiving antenna 1 is input to a front end circuit 3, which comprises a frequency converter circuit driven by a local oscillator signal output from a local oscillator circuit 2. This local oscillator circuit 6 is a variable frequency oscillator, with the local oscillator frequency being varied to perform selection of a desired television channel. A frequency-converted output signal is thereby output from front end circuit 3, which includes a video IF component (at frequency 58.75 MHz) and a audio IF component (at frequency 54.25 MHz). The video IF component is amplified by a video IF amplifier circuit 4, and the resultant output signal from circuit 4 is detected by a video detector circuit, which thereby produces a video signal. In order to facilitate amplification of the audio component of the frequency-converted output signal from front end circuit 3, this is converted to a lower-frequency signal (typically 10.7 MHz) by a frequency converter circuit 7 which is driven by a local oscillator signal produced by a local oscillator circuit 6 which operates at a fixed frequency. The 10.7 MHz IF signal is then amplified by an audio IF amplifier circuit 8, whose output is applied to an audio detector circuit 9. The audio signal thereby produced by audio detector circuit 9 is input to an audio demultiplexer circuit 10, to perform audio channel separation when the audio signal is of stereo multiplex form.

An automatic gain control (AGC) signal is produced from video detector circuit 5, which varies in accordance with the level of the video signal component which is input to video detector circuit 5 and hence in accordance with the level of video signal carrier component in the antenna input signal. This AGC signal is applied to front end circuit 3 and to video IF amplifier circuit 4, to control the amount of gain provided by these circuits and hence hold the level of video signal output from video detector circuit 5 substantially constant with respect to changes in antenna signal level.

With such a prior art split-carrier type of reception system (and also with an intercarrier type of reception system), the video and audio signal components of the television signal are initially processed within the same circuit stages, i.e. front end circuit 3. As a result, the operational requirements which are set for front end circuit 3 are extremely difficult to satisfy, in a practical reception system. This is to say, the front end circuit must perform amplification of signals over a wide range of frequencies, so that both the audio and video carrier components will be output at suitable levels. In addition, the characteristics of the audio and video components of the television signal are basically different, so that it is difficult to perform optimum processing of both of these components in a common front end circuit.

In addition, it is a feature of the split-carrier method of television signal reception that when the video signal component of the received signal falls in level below a permissible value of satisfactory reception (i.e. due to multi-path fading), the audio signal component may remain at a high level, in spite of the fact that the audio and video components are very close in frequency. Conversely, the level of the audio component of the received signal may fall to a low value while the level of the video component remains at a high value. Thus, multi-path fading affects the video and audio components of the received television signal completely differently. However if, as in the prior art example of FIG. 1, AGC is applied to a common front end circuit and is derived based upon the level of the video signal component of the received signal, then it will frequently occur that the level of the output video signal will be kept at a satisfactory level while at the same time the level of the audio signal output, or the signal/noise ratio of the output from the audio detector circuit, will be too poor for satisfactory reception.

Figure 2:
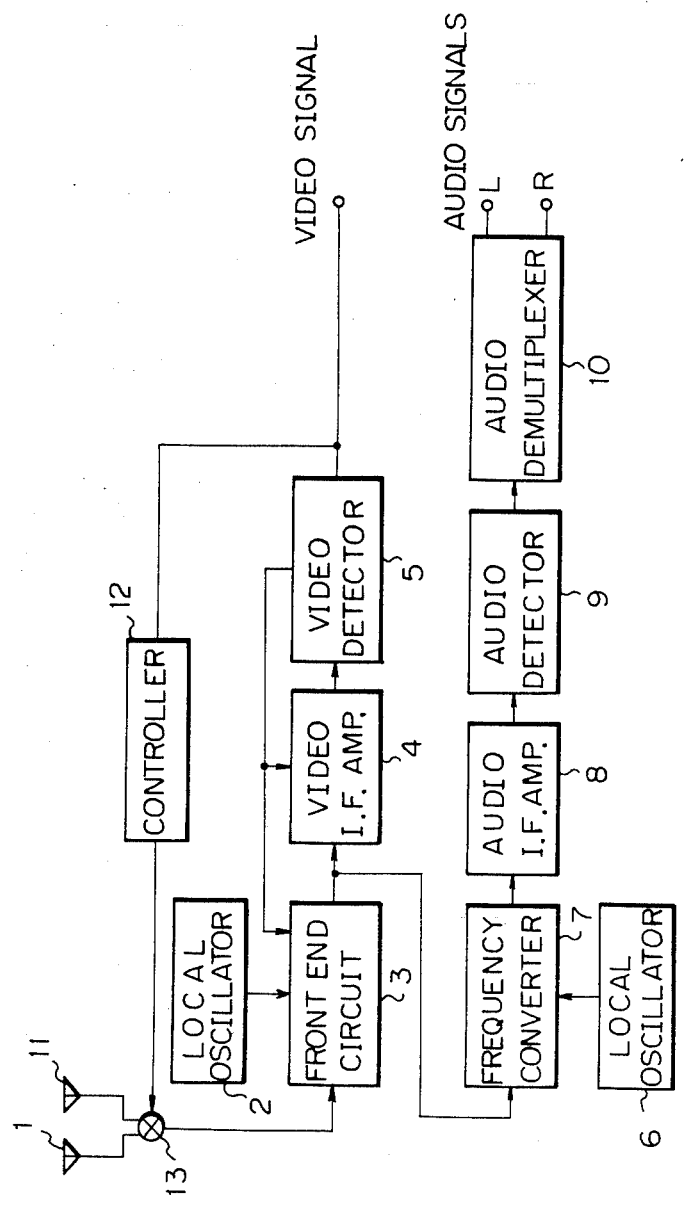
FIG. 2 is a general block circuit diagram of an example of a prior art type of signal receiving system for a television receiver, for diversity reception using two receiving antennas.
Figure 3:
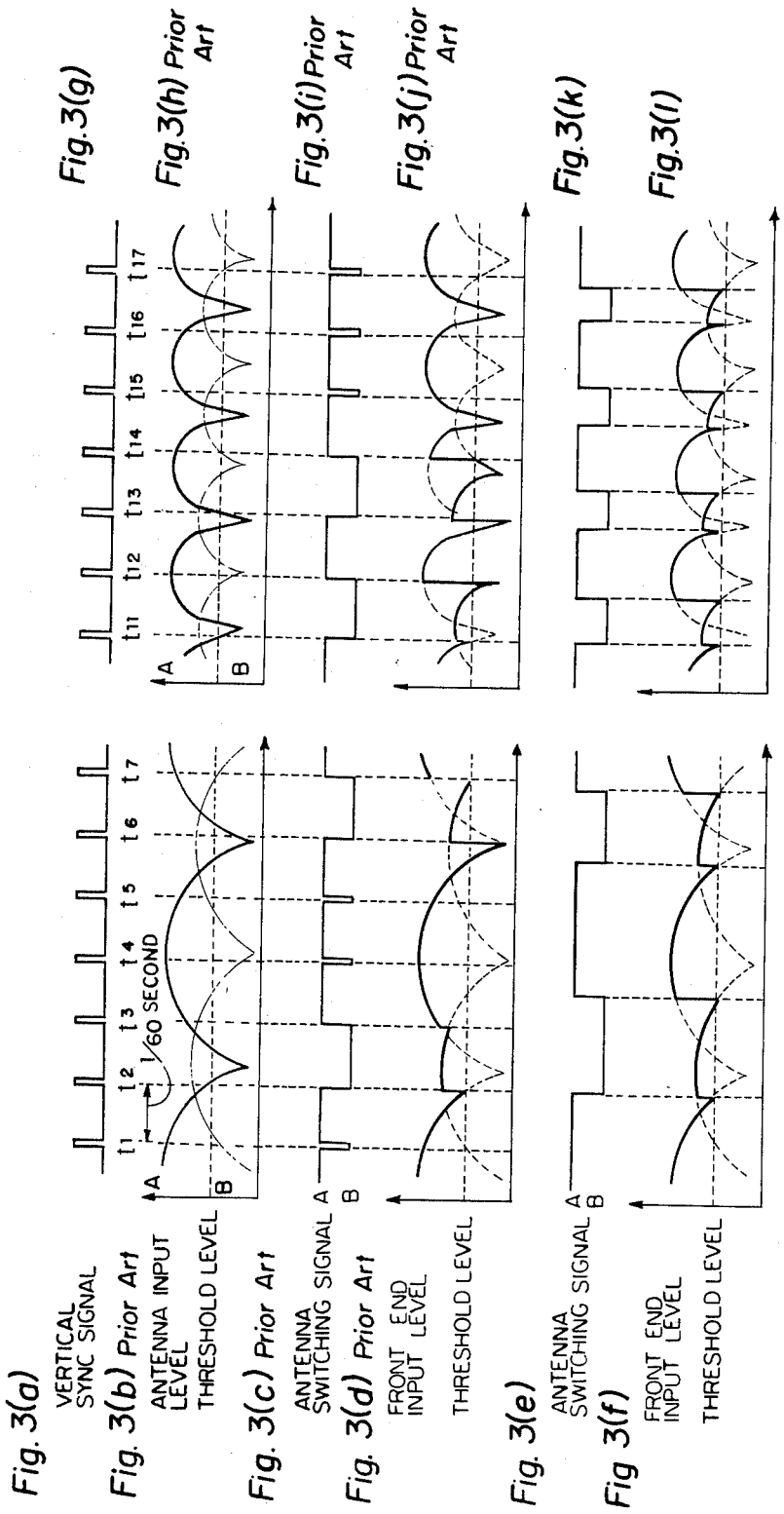
FIGS. 3(a) to 3(l) are waveform diagrams for illustrating respective modes of operation of the prior art example of FIG. 2 and of an embodiment of the present invention.

One method which has been employed in the prior art for reducing the effects of multi-path fading upon television signal reception is illustrated in FIG. 2. This is referred to as diversity reception, with at least one additional receiving antenna being employed and with system operation being controlled such that (ideally) the antenna which will provide the most satisfactory reception at any particular instant is held connected to the receiver input. This control function is performed by a controller 12, which actuates an antenna selector switch. Controller 12 periodically samples the level of the video component of the antenna input signal (as represented by the level of the video signal output from video detector circuit 5), during successive intervals which are sunchronized with the vertical sync signal pulses of the TV receiver (having a 1/60 second period). During each of these sampling intervals, the antenna signal levels from each of antennas 1 and 11 are sampled, and the antenna which produces the higher of these two signal levels is thereafter held connected to the input of front end circuit 3, until the next sampling interval begins. This process is illustrated in the timing chart of FIG. 3, in which FIGS. 3(a) to 3(d) illustrate the operation in the case of antenna signals which exhibit periodic fading at a relatively low frequency, i.e. such as may result from multi-path fading when the antennas are mounted on a slowly moving vehicle. FIGS. 3(g) to 3(j), on the other hand, illustrate the operation for the case of relatively rapid fading, e.g. due to multi-path fading when the antennas are mounted on a rapidly moving vehicle. The sampling pulses are shown in FIGS. 3(a), 3(g), and the input signal levels from antennas 1 and 11 (designated respectively as levels A and B) shown in FIGS. 3(b), 3(h). The corresponding switching signal produced by controller 12 is shown in FIGS. 3(c), 3(i), with the signal attaining a high logic level potential to implement connection of antenna 1 (signal A) to the input of front end circuit 3 and attaining a low potential to implement connection of antenna 11 (signal B) to that input.

The resultant level of antenna signal which is input to front end circuit 3 is shown in FIGS. 3(d), 3(j). As shown, this level is held above a fixed threshold level (i.e. a minimum level of antenna signal for which satisfactory reception quality is obtained), when the frequency of periodic fading is relatively low as in the case of FIG. 3(d). However due to the fixed 1/60 second intervals between the sampling pulses, it is possible that the signal level obtained from the currently selected antenna may fall below the threshold level during an interval between sampling pulses, as in the case of the interval between the sampling pulses at $t_5$ and $t_6$. This is a basic disadvantage of such a prior art type of diversity reception method. Furthermore, this problem becomes more severe as the frequency of periodic fading increases, e.g. as the speed of a vehicle containing the television receiver is increased. This is illustrated in FIGS. 3(g) to 3(j). As shown, there will be many occasions on which the level of signal obtained from the currently selected antenna will fall below the threshold level.

In addition, multi-path fading affects the video and audio components of the received RF signal differently, so that even if antenna selection is performed such as to maintain the level of the video signal component above a predetermined threshold level, the audio signal component may fall below this level frequently, i.e. the antenna currently selected may be be that which provides the highest level of audio signal component. In addition, although the variations in antenna signal input level which occur during the sampling intervals will not affect the video signal, since these occur during the vertical blanking intervals, these periodic variations will produce a 1/60 Hz noise component in the output audio sign.

Thus, prior art types of signal receiving system for a television receiver which employ a common front end circuit to process both the video and audio components of an antenna signal have basis disadvantages, which are particularly severe when it is necessary to provide automatic gain control in the presence of heavy periodic multi-path fading, as in the case of a television receiver mounted in a moving vehicle.

Figure 4:
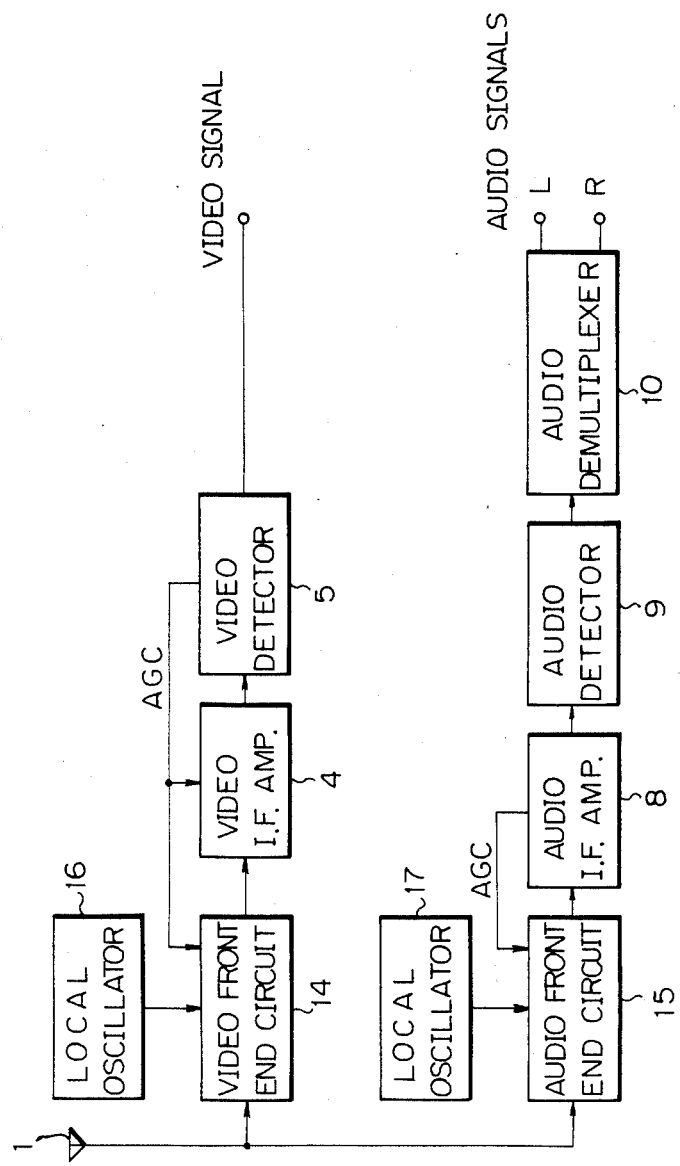
FIGS. 4 and 5 are block circuit diagrams of embodiments of the present invention for use with a single receiving antenna.

FIG. 4 is a block circuit diagram of a first embodiment of a signal receiving system for a television receiver according to the present invention, for operation from a single antenna. Components corresponding to those in the example of FIG. 1 are indicated by corresponding reference numerals. Two independent front end circuits 14 and 15 are incorporated, with the input of each front end circuit being coupled to receiving antenna 1, and with local oscillator signals being applied to each from local oscillator circuits 16 and 17 respectively. In this embodiment, front end circuit 14 is utilized solely to provide a frequency-converted output signal from which the video component of the antenna signal is derived, by IF amplifier circuit 4, while front end circuit 15 is utilized solely to provide a frequency-converted output signal from which the audio component of the antenna signal is derived, by IF amplifier circuit 8. Independent AGC control is applied to front end circuits 14 and 15, with front end circuit 14, together with IF ampmlifier circuit 4 being controlled by an AGC signal produced from video detector circuit 5, while front end circuit 15 is controlled by an AGC signal produced from IF amplifier circuit 8. The video IF signal component of the output from front end circuit 14 is typically 58.75 MHz, while the audio IF signal component of the output from front end circuit 15 is typically 10.7 MHz. It can thus be understood that the system of FIG. 4 enables the IF frequencies of the video and audio signal components to be selected independently of one another, for optimum processing of each component, as a result of the use of two independent front end circuits 14 and 15.

In addition, since the AGC operation of the video and audio signal paths are mutually independent, improved AGC performance can be attained. That is to say, it will frequently occur that the antenna signal levels of the video and audio components will be different from one another, during periodically varying multi-path fading. However this can be substantially counteracted, due to the fact that AGC operation on each signal component is performed in an independent manner.

Moreover, design, manufacture and adjustment of each of these independent front end circuits can be carried out in a much more simple manner than is possible in the case of a conventional type of front end circuit which must be capable of processing both the video and audio components of the antenna signal, e.g. which must operate over a wider band-width. This simplicity results in the cost of each independent front end circuit being substantially lower than that of a conventional type of front end circuit for common audio/video component processing, so that the overall manufacturing cost of a television receiver incorporating a pair of such independent front end circuits will not be substantially increased.

Also, due to the fact that the two front end circuits 14 and 15 are mutually independent, it is possible to build front end circuit 14 into a television monitor, for example, and front end circuit 15 into an AM/FM tuner, i.e. to mount the two front end circuits in separate equipment units. In this case, overall control (e.g. for synchronization of TV channel selection by front end circuits 14 and 15) can be performed utilizing microprocessors.

Figure 5:
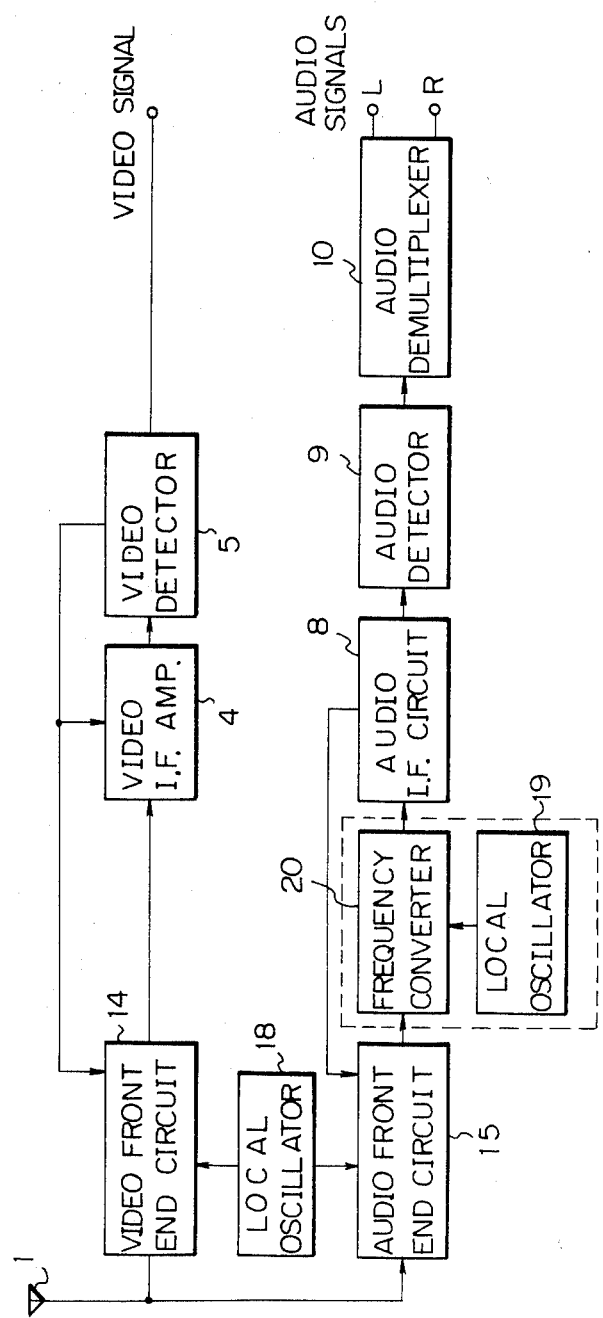

FIG. 5 shows a second embodiment of the present invention. This is essentially identical to that of FIG. 4, but differs in that a common local oscillator circuit 18 is employed to drive both video signal front end circuit 14 and audio signal front end circuit 15, i.e. a common local oscillator signal frequency is employed for both front end circuits. In order to facilitate subsequent IF amplification of the audio component, it will generally be necessary to perform further frequency conversion of the output signal from front end circuit 15, to a lower IF frequency. This can be performed by means of an additional frequency converter circuit 20 which is driven by local oscillator signal applied from a fixed-frequency local oscillator circuit 19. This embodiment has the advantage of requiring only a single variable frequency local oscillator circuit, so that control of channel switching is simplified. Thus, adjustment will be simpler than in the case of the embodiment of FIG. 1, and manufacturing costs can be lower.

Figure 6:
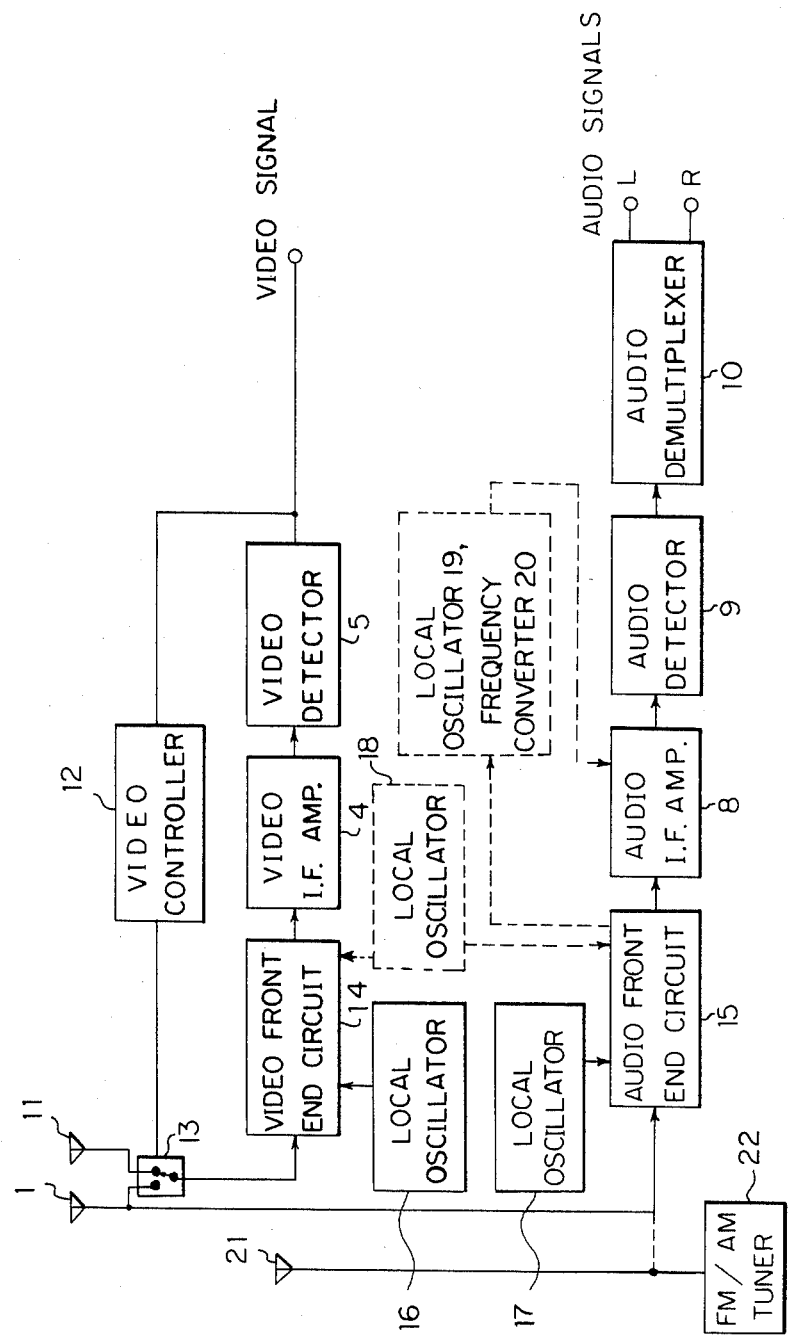
FIGS. 6, 7, 8, 9 and 10 show embodiments of the present invention for use with diversity reception, employing two receiving antennas.

FIG. 6 shows a third embodiment of the present invention, in which components corresponding to those in the prior art example of FIG. 2 are indicated by corresponding reference numerals. This embodiment employs diversity reception. As in the embodiments of FIG. 4 and FIG. 5, (independently operating) separate front end circuits 14 and 15 are incorporated to process the audio and video signal components, respectively, through frequency conversion performed by applying local oscillator signals from respective local oscillators 16 and 17 or by applying a common local oscillator signal from a local oscillator 18. Two receiving antennas 1 and 11 are mounted spaced apart from one another, i.e. at different positions upon the exterior of the vehicle body in the case of a television receiver which is mounted in a vehicle. Antennas 1 and 11 are respectively coupled to an antenna selector switch 13, which selects one antenna to be coupled to the input of front end circuit 14. In addition, antenna 1 is fixedly coupled to the input of audio signal front end circuit 15. As indicated, it is alternatively possible to connect a separate antenna 21 of an AM/FM tuner to the input of front end circuit 15, rather than antenna 1. A controller 12 is connected between antenna selector switch 13 and the output from video detector circuit 5.

Controller 12 may be a circuit which acts to periodically sample the signals from receiving antennas 1 and 11, e.g. at 1/60 second intervals corresponding to the vertical sync pulses as described for the prior art example of FIG. 2 hereinabove. However it is also possible for controller 12 to be a circuit which determines, from the results of this sampling, the antenna which will provide the minimum degree of multipath "ghost" effect upon the television picture, and selects this antenna to be coupled to front end circuit 14, or which determines the antenna which will provide the best compromise between signal level and multipath "ghost" effect.

In this embodiment, diversity reception is only applied to the video signal component, while antenna 1 (or 21) is held fixedly connected to the audio signal front end circuit 15. This is feasible due to the fact that, as described hereinabove, multi-path fading will only have a relatively small effect upon the output audio signal, and hence upon the audible output perceived by the user. This embodiment has the advantage of eliminating the presence of noise due to the sampling process in the output audio signal, while at the same time enabling improved picture quality due to the use of diversity reception of the video signal.

Figure 7:
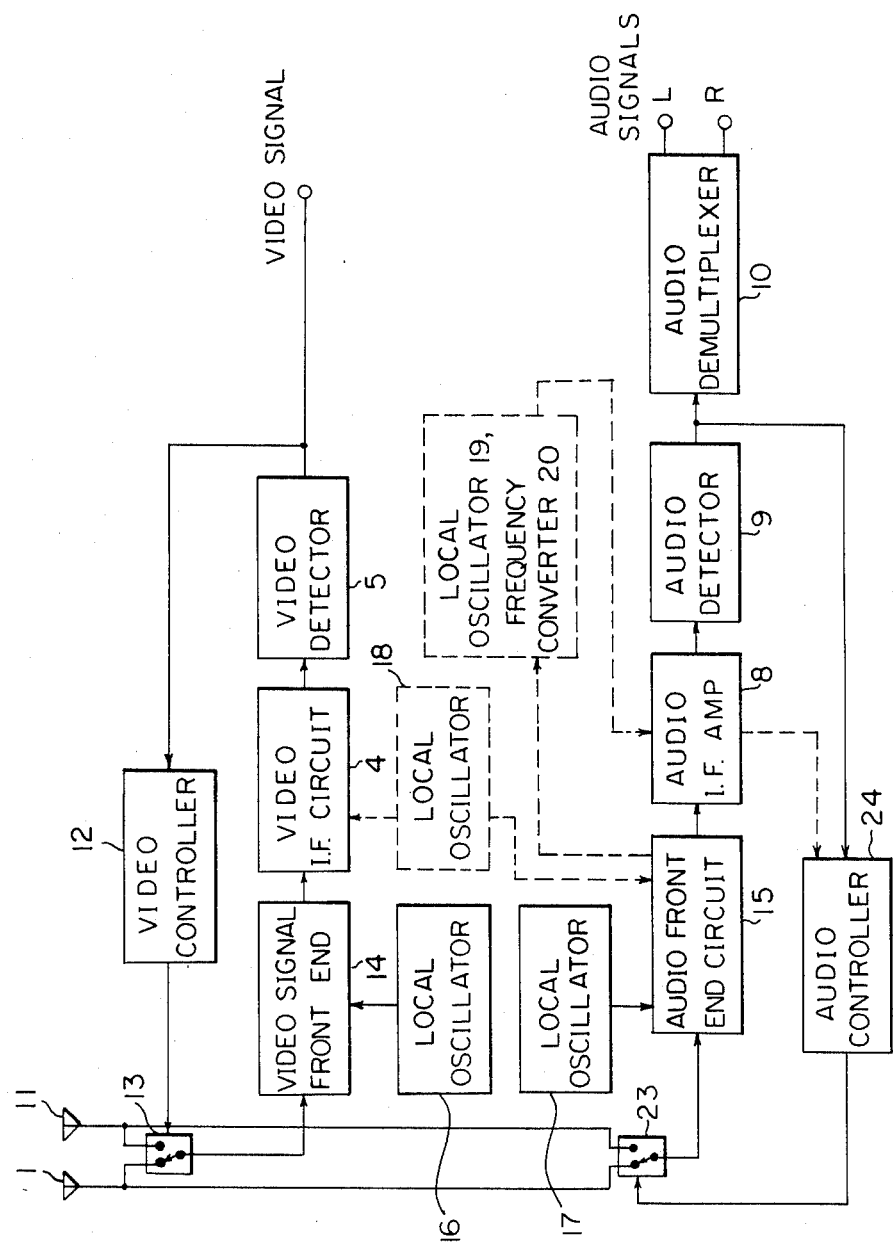

FIG. 7 shows another embodiment in which diversity reception is utilized. In this case, diversity reception is applied to both the video and audio components of the television signal. Two receiving antennas 1 and 11 are selected to be coupled to the input of video signal front end circuit 14 by means of an antenna selector switch 13, and are selected to be coupled to the input of audio signal front end circuit 15 by means of an antenna selector switch 23. Operation of antenna selector switch 13 is controlled by a controller 12, as described above for the embodiment of FIG. 6, while operation of antenna selector switch 23 is controlled by a contoller 24 on the basis of the output signal level (or noise level) from audio detector circuit 9, or, alternatively, an IF signal level from IF amplifier circuit 8. More specifically, if the level of signal applied to audio signal front end circuit 15 from the antenna which is currently coupled thereto should fall below a predetermined threshold, then the other antenna is immediately selected by antenna selector switch 23 under the control of controller 24. This provides satisfactory diversity reception operation due to the fact that, in general, the output signals from both antennas will not usually be below the threshold level simultaneously. Thus, antenna switch-over, from an antenna which is producing an excessively low signal level, will generally result in a satisfactory signal level being obtained.

In this embodiment, control of diversity reception for the audio and video signal components is performed in a mutually independent manner, so that optimum picture and sound quality can be attained. In addition, since periodic sampling of the antenna signals is not performed to control operation of the audio signal diversity reception system, the sampling noise problem described hereinabove, which arises when the same AGC system is employed for both the audio and video signal components, is completely eliminated. The operation of the audio signal diversity reception system in this embodiment is illustrated in FIGS. 3(e) and 3(f) which respectively show the control signal produced by controller 24 in response to the antenna signal level changes shown in FIG. 3(b) and the resultant input signal level applied to front end circuit 15, for the case of periodic signal fading at a relatively low frequency, and in FIGS. 3(k) and 3(l) which respectively show the control signal from controller 24 in response to the antenna signal level changes shown in FIG. 3(h) and the resultant input signal applied to front end circuit 15, for the case of fading which occurs at a relatively high frequency. In the case of FIG. 3(f), it can be understood that more reliable diversity reception control is achieved, e.g. the problem of the received signal from the currently selected antenna falling below the threshold level which occurs during time interval $t_5$ to $t_6$ with the prior art example, which would result in noise being produced in the output audio signal, is completely eliminated. Furthermore in the case of rapid periodic fading, as illustrated in FIG. 3(h), the diversity reception system of the embodiment of FIG. 7 provides much faster response to antenna signal level changes than does the prior art example. Thus, the problem of the antenna signal level falling frequently below the threshold level, as illustrated in FIG. 3(j), is substantially entirely eliminated, as illustrated in FIG. 3(l). This method of implementing diversity reception of the audio signal component therefore makes the installation of a television receiver in a rapidly moving vehicle much more practicable than has been possible with prior art methods.

Figure 8:
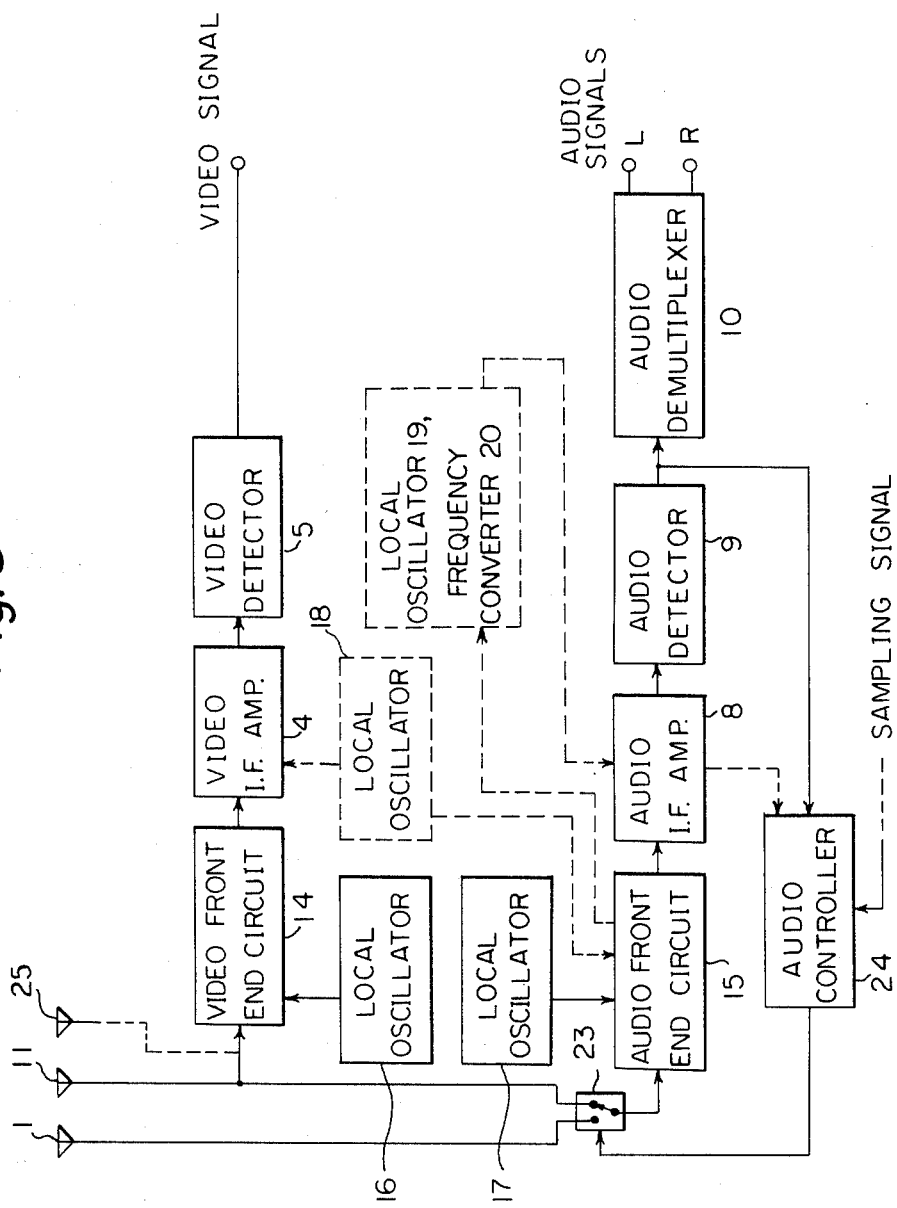

FIG. 8 shows another embodiment of a signal receiving system for a television receiver according to the present invention, in which diversity reception is applied only to the audio signal component of the television signal. The receiving antennas 1 and 11 are selected to be coupled to the input of audio signal front end circuit 15 by antenna selector switch 23 under the control of controller 24, as in the embodiment of FIG. 7. However the input of video signal front end circuit 14 is fixedly connected to one of antennas 1 and 11. Alternatively, the input of front end circuit 14 can be held fixedly connected to some other antenna, as indicated by numeral 25.

Figure 9:
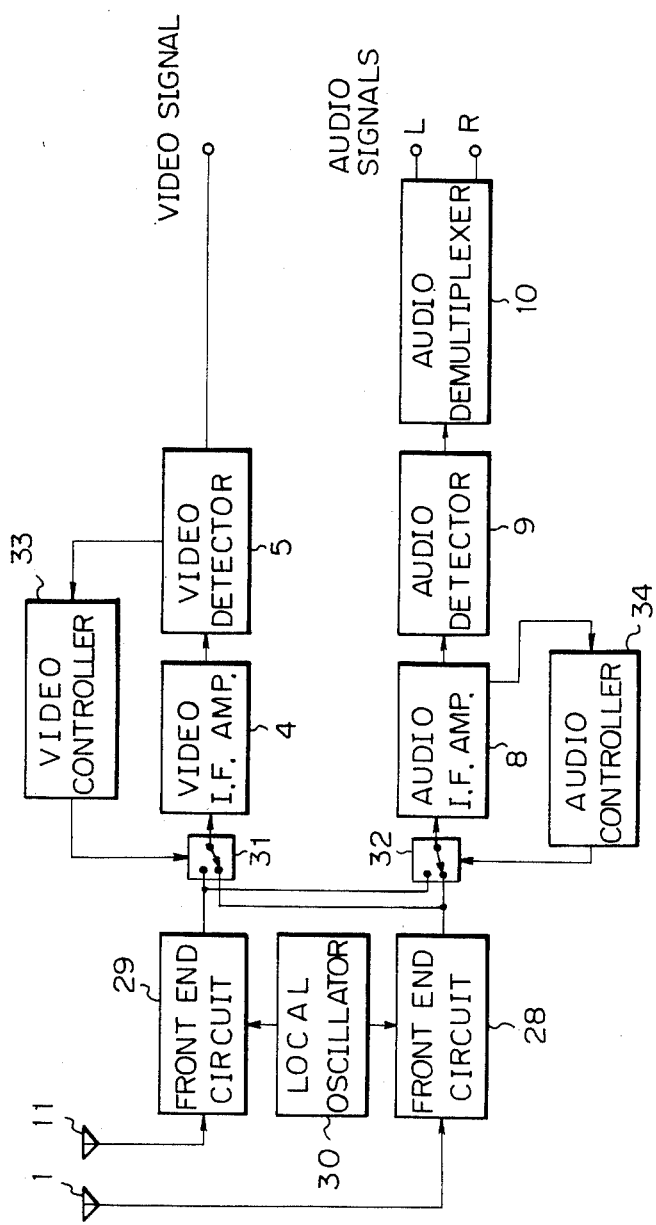

Although the method of audio signal diversity reception operation utilized in the embodiments of FIGS. 7 and 8 above will substantially reduce switching noise by eliminating the noise resulting from sampling the signal levels from the two antennas periodically, there will still be a certain amount of switching noise produced when changeover from one antenna to the other takes place. This switching noise can be substantially reduced if signal switching is performed after the television signal has been frequency converted from an RF signal to a lower frequency, i.e. after output from the front end circuits. In addition, it as advantageous to hold each of the two antennas fixedly coupled to a corresponding one of two independent front end circuits, in order to attain maximum signal-to-noise ratio. This is especially important when the received signal strength is very low. FIG. 9 shows another embodiment of a signal receiving system for a television receiver according to the present invention which is designed on the basis of the above considerations.

In the embodiment of FIG. 9, a common local oscillator signal is applied from a variable frequency local oscillator circuit 30 to each of front end circuits 28 and 29. Antennas 1 and 11 are fixedly coupled to the inputs of front end circuits 28 and 29. The frequency-converted output signals from front end circuits 29 and 28 are each input to both of a pair of switches 31 and 32, whose outputs are coupled to the input of video IF amplifier circuit 4 and to the input of audio IF circuit 8 respectively. Thus, switch 31 is operable to connect either the output signal from front end circuit 29 or that from front end circuit 28 to the input of video IF circuit 4, while switch 32 is operable to connect either the output signal from front end circuit 29 or that from front end circuit 28 to the input of audio IF circuit 8. The selection operation of switch 31 is controlled by a controller 33, based upon the level of signal detected by video detector circuit 5. The selection operation of switch 32 is controlled by a controller 34, based upon the level of signal amplified by IF amplifier circuit 8.

In this way, the video signal component is input to IF amplifier circuit 4 from either the output of front end circuit 29 or that of front end circuit 28, under the control of controller 33, while the audio signal component is input to IF amplifier circuit 8 from either the output of front end circuit 29 or that of front end circuit 28, under the control of controller 34. Thus, diversity reception is performed in a mutually independent manner for the video and audio components of the television signal. In this embodiment, signal switching for implementing diversity reception operation is performed after signal conversion has been carried out to a lower frequency than that of the antenna signal frequency. This effectively reduces the effect of switching noise upon the output audio signal, even if switching operation is carried out at high speed. In addition, since no attenuation of the antenna signal will be produce before the signal is input to each front end circuit, maximum signal-to-noise ratio can be attained. Thus, this embodiment enables the problems which arise with respect to direct switching of the antenna signals, to implement diversity reception, to be effectively eliminated.

Figure 10:
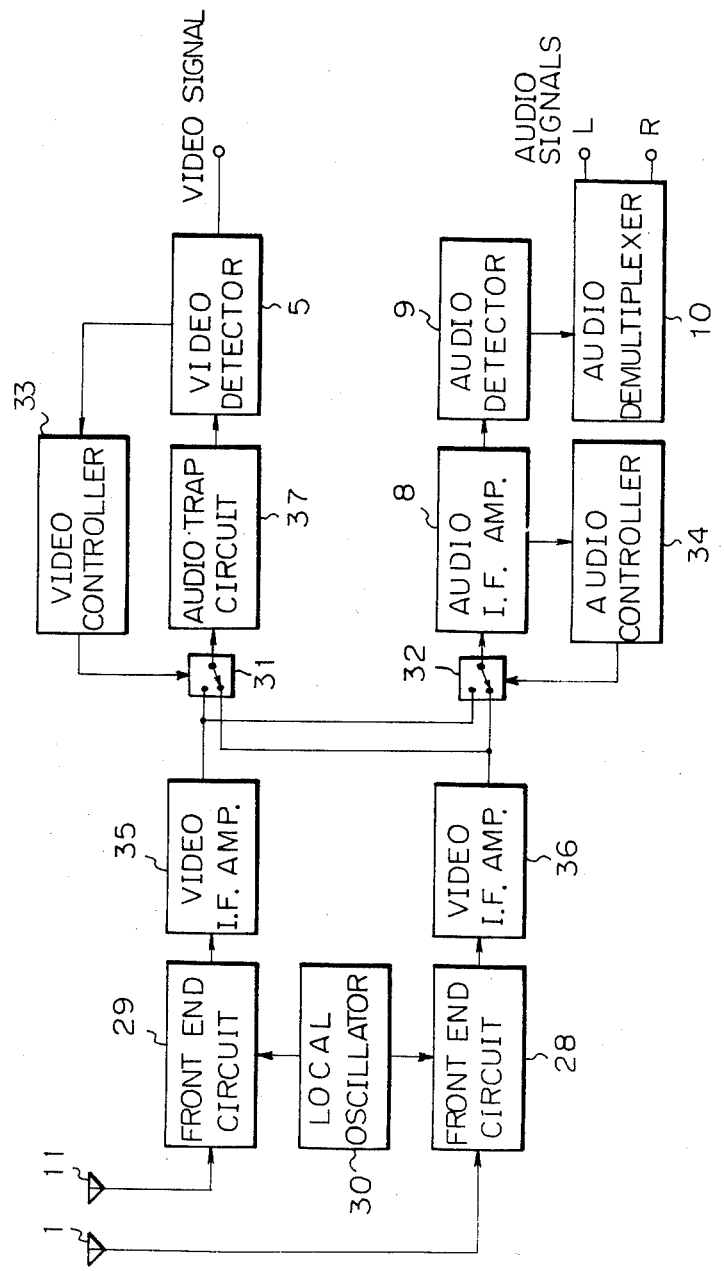

FIG. 10 shows another embodiment of a signal receiving system for a television receiver according to the present invention, which has similar objectives to that of FIG. 9. However in the embodiment of FIG. 10, the frequency-converted output signals from front end circuits 29 and 28 are respectively applied directly to the input stages of two video IF amplifier circuits 35 and 36. The IF signals output from video IF amplifier circuits 35 and 36 are input to both of switches 31 and 32, whose outputs are coupled respectively to an audio trap circuit 37 and to the input stage of an audio IF amplifier circuit 8. With this embodiment, the amplified video and audio IF signal components from video IF amplifier circuits 35 and 36 are selected independently, by means of switches 31 and 32, to implement diversity reception. This embodiment will provide a lower level of switching noise than that of FIG. 9, and also enhanced signal-to-noise ratio when signals of very low strength are received, since the output signals from front end circuits 29 and 28 are applied directly to the inputs of IF amplifier circuits 35 and 36, rather than through switches.

In the embodiments of FIG. 9 and FIG. 10, it will of course be necessary that each of front end circuits 28 and 29 be designed to handle both the audio and video signal components of the television signal. Furthermore in the embodiment of FIG. 10, it will be necessary for each of video IF amplifier circuits 35 and 36 to be of sufficient bandwidth to amplify both the video and audio IF frequency components.

It will be understood from the above that it is an essential feature of a signal receiving system for a television receiver according to the present invention that at least two front end circuits are utilized, and that it is possible to independently select the frequency-converted output signals from these front end circuits (or respective IF signals derived from these output signals) to be utilized to derive the audio and video components of the television signal. In the case of a television receiver operating from a single antenna, this enables AGC action to be applied separately to the video and audio signal components, to provide improved AGC control of the output audio signal and a considerable reduction in switching noise resulting from the periodic sampling operation involved in video signal AGC control. In the case of a television receiver which employs diversity reception, control of antenna selection is performed independently for the video and audio signal components respectively, so that selection of the most appropriate antenna for optimum sound and image quality can be continuously maintained.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A television receiver having a video and audio signal receiving system for producing audio and video signals in response to antenna signals provided from at least one antenna, said system comprising:

local oscillator circuit means for producing first and second local oscillator signals respectively;

first and second front end circuits each adapted to receive as inputs an antenna signal from said at least one antenna and respectively coupled to receive said first and second local oscillator signals, for thereby performing frequency conversion of said antenna signal to produce respective first and second frequency-converted output signals;

video IF amplifier circuit means having an input thereof coupled to receive said first frequency-converted output signal, for selecting and amplifying a video signal component of said first frequency-converted output signal;

audio IF amplifier circuit means having an input thereof coupled to receive said second frequency-converted output signal, for selecting and amplifying an audio signal component of said second frequency-converted output signal, and further producing an audio automatic gain control signal varying in accordance with the level of said audio signal component input thereto, and in which said audio automatic gain control signal is applied at least to said second front end circuit to control a level of amplification provided thereby;

video detector circuit means coupled to receive said video signal component from said video IF amplifier circuit means, for producing therefrom said video signal and a video automatic gain control signal varying in accordance with the level of said video signal component input thereto, and in which said video automatic gain control signal is applied at least to said first front end circuit to control a level of amplification provided thereby; and audio detector circuit means coupled to receive said audio signal component from said IF amplifier circuit means, for producing therefrom said audio signal.

2. A television receiver according to claim 1, in which said antenna signals are input in common to said first and second front end circuits from a single antenna.

3. A television receiver according to claim 1, in which said antenna signals are provided from a plurality of antennas.

4. A television receiver according to claim 3, and further comprising antenna selector switch means for selectively coupling at least first and second ones of said antennas to an input of at least one of said first and second front end circuits, and controller means for controlling operation of said switch means.

5. A television receiver according to claim 4, in which said output signal from said first front end circuit is fixedly input to said video IF amplifier circuit means and said output signal from said second front end circuit is fixely input to said audio IF amplifier circuit means.

6. A television receiver according to claim 5, in which said antenna selector switch means comprise an antenna switch which is operable to selectively couple antenna signals from said first and second antennas only to be input to said first front end circuit, and in which said controller means comprise a video signal controller which acts to detect that said level of a video signal component contained in said antenna signal provided from the one of said first and second antennas which is currently coupled to said first front end circuit has fallen below a predetermined threshold, and is responsive to detection of such a condition for implementing switching changeover by said antenna selector switch to thereby couple the other one of said first and second antennas to said first front end circuit.

7. A television receiver according to claim 6, in which said second front end circuit is fixedly coupled to receive an antenna signal from one of said first and second antennas.

8. A television receiver according to claim 6, in which said second front end circuit is fixedly coupled to receive an antenna signal from an antenna other than one of said first and second antenna.

9. A television receiver according to claim 6, in which said video signal controller detects the level of said video signal component based upon a level of IF signal produced by said video IF amplifier circuit means.

10. A television receiver according to claim 5, in which said antenna selector switch means comprise an antenna switch which is operable to selectively couple said antenna signals from said first and second antennas only to be input to said second front end circuit, and in which said controller means comprise an audio signal controller which acts to detect that a level of said audio signal component contained in said antenna signals provided from the one of said first and second antennas which is currently coupled to said second front end circuit has fallen below a predetermined threshold, and is responsive to the detection of such a condition for implementing switching changeover by said antenna selector switch to thereby couple the other one of said first and second antennas to said second front end circuit.

11. A television receiver according to claim 10, in which said first front end circuit is fixedly coupled to receive an antenna signal from one of said first and second antennas.

12. A television receiver according to claim 10, in which said first front end circuit is fixedly coupled to receive an antenna signal from an antenna other than one of said first and second antennas.

13. A television receiver according to claim 10, in which said audio signal controller detects the level of said audio signal component based upon a level of IF signal produced by said audio IF amplifier circuit means.

14. A television receiver according to claim 10, in which said audio signal controller detects the level of said audio signal component based upon a level of output signal produced from said audio detector circuit means.

15. A television receiver according to claim 5, in which said antenna selector switch means comprise a first antenna switch operable to selectively couple said antenna signals from said first and second antennas to an input of said first front end circuit, and a second antenna selector switch operable to selectively couple said antenna signals from said first and second antennas to an input of said second front end circuit, and in which said controller means comprise a video signal controller which acts to detect that said level of a video signal component contained in said antenna signals provided from the one of said first and second antennas which is currently coupled to said first front end circuit has fallen below a predetermined threshold, and is responsive to the detection of such a condition for implementing switching changeover by said first antenna selector switch to thereby couple the other one of said first and second antennas to said first front end circuit, and an audio signal controller which acts to detect that the level of said audio signal component contained in said antenna signals provided from the one of said first and second antennas which is currently coupled to said second front end circuit has fallen below a predetermined threshold, and is responsive to the detection of such a condition for implementing switching changeover by said second antenna selector switch to thereby couple the other one of said first and second antennas to said second front end circuit.

16. A television receiver according to claim 3, in which said antenna signals from a first and from a second antennas are fixedly input to said first and second front end circuits respectively.

17. A television receiver according to claim 16, and further comprising a first switch operable to selectively apply said frequency-converted output signals from said first and second front end circuits respectively to an input of said video IF amplifier circuit means, a second switch operable to selectively apply said frequency-converted output signals from said first and second front end circuits respectively to an input of said audio IF amplifier circuit means, a video signal controller which acts to detect that a level of said video signal component contained in said frequency-converted output signal provided from the one of said first and second front end circuits which is currently coupled to said video IF amplifier circuit means has fallen below a predetermined threshold, and is responsive to the detection of such a condition for implementing switching changeover by said first switch to thereby couple the other one of said first and second front end circuits to said video IF amplifier circuit means, and an audio signal controller which acts to detect that a level of said audio signal component contained in said frequency-converted output signal provided from the one of said first and second front end circuits which is currently coupled to said audio IF amplifier circuit means has fallen below a predetermined threshold, and is resposive to the detection of such a condition for implementing switching changeover by said second switch to thereby couple the other one of said first and second front end circuits to said audio IF amplifier circuit means.

18. A television receiver according to claim 16, in which said video IF amplifier circuit means comprises a first video IF circuit fixedly coupled to receive said frequency-coverted output signal from said first front end circuit means and a second video IF circuit fixedly coupled to receive said frequency-converted output signal from said second front end circuit means, each of said first and second video IF amplifier circuits serving to produce an IF output signal comprising said video and audio components of said frequency-converted output signals, and further comprising a first switch operable to selectively apply said IF output signals from said first and second video IF circuits respectively to an input of said video detector circuit means, a second switch operable to selectively apply said IF output signals from said first and second video IF circuits respectively to an input of said audio IF amplifier circuit means, a video signal controller which acts to detect that a level of said video signal component contained in said IF output signal provided from the one of said first and second video IF circuits which is currently coupled to said video detector circuit means has fallen below a predetermined threshold, and is responsive to the detection of such a condition for implementing switching changeover by said first switch to thereby couple the other one of said first and second video IF circuits to said video detector circuit means, and said audio signal controller which acts to detect that a level of an audio signal component contained in said video IF output signal provided from the one of said first and second video IF circuits which is currently coupled to said audio detector circuit means has fallen below a predetermined threshold, and is responsive to the detection of such a condition for implementing switching changeover by said second switch to thereby couple the other one of said first and second video IF circuits to said audio detector circuit means.

19. A television receiver according to claim 18, and further comprising an audio trap circuit coupled between said first switch and said video detector circuit means.

20. A television receiver having a video and audio signal receiving system for producing audio and video signals in response to first and second antenna signals respectively provided from a first and a second antenna, said system comprising:
- local oscillator circuit means for producing first and second oscillator signals respectively;
- first and second antenna selector switch means each coupled to both of said first and second antennas for selective transfer of said first and second antenna signals from said first and second antennas respectively;
- a video signal front end circuit coupled to receive said first local oscillator signal from said local oscillator circuit means and to receive one of said antenna signals from one of said first and second antennas, transferred by said first antenna selector switch means, for performing frequency conversion of said antenna signal to produce an intermediate-frequency signal containing a video frequency component;
- a video intermediate-frequency amplifier circuit for amplifying said intermediate-frequency signal produced from said video signal front end circuit to produce an output intermediate-frequency signal, and a video detector circuit for deriving said video signal from said output intermediate-intermediate signal of said video intermediate-frequency amplifier circuit;
- a video signal controller for detecting a condition in which a level of said video frequency component in said video signal has fallen below a first predetermined value, while one of said first and second antenna signals being transferred to said video signal front end circuit, and responsive to the detection of said condition for controlling switching changeover by said first antenna selector switch means to transfer the other one of said first and second antenna signals to said video signal front end circuit;
- an audio signal front end circuit coupled to receive said second oscillator signal from said local oscillator circuit means, and to receive one of said antenna signals from one of said first and second antennas, transferred by said second antenna selector switch means, for performing frequency conversion of said antenna signal transferred by said second antenna selector switch means, to produce an intermediate-frequency signal containing an audio frequency component;
- an audio intermediate-frequency amplifier circuit for amplifying said intermediate-frequency signal produced from said audio signal front end circuit to produce an output intermediate-frequency signal, and an audio detector circuit for deriving said audio signal from said output intermediate-frequency signal of said audio intermediate-frequency amplifier circuit; and
- an audio signal controller for detecting a condition in which a level of said audio frequency component in said audio signal has fallen below a second predetermined value, while one of said first and second antenna signals is being transferred to said audio signal front end circuit, and responsive to detection of said condition in said audio signal for controlling said switching changeover by said second antenna selector switch means to transfer the other one of said first and second antenna signals to said audio signal front end circuit.

21. A television receiver according to claim 20, in which said video signal controller performs said detection operation based upon said video signal produced from said video signal detector circuit.

22. A television receiver according to claim 21, in which said audio signal controller performs said detection operation based upon said audio signal produced from said audio signal detector circuit.

23. A television receiver according to claim 21, in which said audio signal controller performs said detection operation based upon an intermediate frequency output signal produced from said audio intermediate-frequency amplifier circuit.

* * * * *